United States Patent
Toyoda et al.

[11] 3,908,606
[45] Sept. 30, 1975

[54] INTERNAL COMBUSTION ENGINE

[75] Inventors: Eiji Toyoda, Toyota; Masaaki Noguchi, Nagoya; Yukiyasu Tanaka; Bunda, Tsuchio, both of Okazaki; Masaharu Sumiyoshi, Toyota, all of Japan

[73] Assignee: Toyota Jidosha Kogyo Kabushiki Kaisha, Japan

[22] Filed: Jan. 4, 1974

[21] Appl. No.: 430,650

[30] Foreign Application Priority Data
Feb. 15, 1973 Japan.............................. 48-18608

[52] U.S. Cl. ................ 123/3; 123/DIG. 12; 48/212
[51] Int. Cl.² ......................................... F02B 43/08
[58] Field of Search ....... 123/1, 1 A, 3, 127, 122 G, 123/122 R, DIG. 12, 142, 119 E; 48/212

[56] References Cited
UNITED STATES PATENTS

| | | | |
|---|---|---|---|
| 1,717,767 | 7/1929 | Diaz........................................ | 123/3 |
| 2,201,965 | 5/1940 | Cook ...................................... | 123/3 |
| 2,225,647 | 7/1937 | Liekendael ..................... | 123/122 G |
| 2,235,401 | 3/1941 | Gier........................................ | 48/212 |
| 2,578,475 | 12/1951 | Hirsch et al. ....................... | 123/1 A |
| 2,613,144 | 1/1950 | Carnahan........................... | 123/142 |
| 3,171,395 | 2/1962 | Bartholomew...................... | 123/127 |
| 3,439,658 | 7/1967 | Simonet.............................. | 123/127 |
| 3,682,142 | 8/1972 | Newkirk ............................. | 123/1 A |
| 3,682,605 | 8/1972 | Wada................................... | 48/212 |
| 3,828,736 | 8/1974 | Koch.................................... | 123/1 A |

OTHER PUBLICATIONS
Cook, Def. Pub. of Serial No. 216231, filed Jan. 7, 1972, T903,020.

Primary Examiner—Wendell E. Burns
Assistant Examiner—David D. Reynolds
Attorney, Agent, or Firm—Oblon, Fisher, Spivak, McClelland & Maier

[57] ABSTRACT

An internal combustion engine constructed such that a part of the hydrocarbon fuel supplied can be reformed into the mixture of decomposition and oxidation products by a fuel reforming means, which is then introduced into the cylinders.

42 Claims, 13 Drawing Figures

INTERNAL COMBUSTION ENGINE

BACKGROUND OF THE INVENTION

1. Field of the Invention

The present invention relates to an internal combustion engine and more particularly to an internal combustion engine which reduces the emission of harmful elements in the exhaust gas thereof.

2. Description of the Prior Art

Conventional internal combustion engines have not been constructed such that the fuel used can be improved before being supplied to the cylinders. With the conventional internal combustion engines in use, research efforts have been primarily directed to the elimination of harmful elements from the exhaust gas or to the perfection of combustion of fuel, but very little attention has been directed to improvement of the fuel to be used.

SUMMARY OF THE INVENTION

It is accordingly an object of the present invention to provide an internal combustion engine in which efficient combustion of the fuel and purification of the exhaust gas is attained.

It is still a further object of the present invention to provide an internal combustion engine which is constructed such that a part of the hydrocarbon fuel is treated in the presence of oxygen to obtain a mixture of decomposition and oxidation products including various reaction products and wherein this mixture is supplied to the cylinders.

Briefly, in accordance with one embodiment of this invention, these and other objects are attained by providing an internal combustion engine constructed such that a part of the hydrocarbon fuel supplied can be reformed into the mixture of decomposition and oxidation products by a fuel reforming means, which is then introduced into the cylinders.

The improved mixture of decomposition and oxidation products of the present invention includes chemical species, such as aldehydes and ketones, lower aliphatic hydrocarbons with 1-5 carbon atoms; hydrogen; carbon monoxide; carbon dioxide; alkylbenzene derivatives; organic carboxylic acid, and the like. The feed containing the product mixture in the cylinders influences the following:

Firstly, the aldehydes and ketones and their intermediate in the process of oxidation are highly effective for improvement and control of the combustion process;

secondly, the components present in the mixture of decomposition and oxidation products such as lower aliphatic hydrocarbons produced by chemical bond rupture, evaporated hydrocarbons of fuel, carbon monoxide and hydrogen, together with the components mentioned above which exert the first effect, are useful for increasing the burning velocity and improving the combustion process itself, notably for improving the ignition and combustion process when they exist in the vicinity of the ignition source or the flame surface; and thirdly, the hydrogen in the mixture of decomposition and oxidation products contributes to reduction and decomposition of nitrogen oxides generated in the combustion process, together with carbon monoxide and others.

BRIEF DESCRIPTION OF THE DRAWINGS

The objects and features of the invention will become apparent to those skilled in the art as the disclosure is made in the following description of a preferred embodiment of the invention, as illustrated in the accompanying drawings, in which.

DESCRIPTION OF THE PREFERRED EMBODIMENT

The present invention relates to an internal combustion engine wherein a part of the hydrocarbon fuel is treated in the presence of oxygen or air, thereby obtaining a mixture of decomposition and oxidation products with various compositions, and wherein the mixture is then supplied to the cylinders.

When a hydrocarbon fuel is treated at high temperatures in the presence of excessive amounts of oxygen (or air), the oxidation reaction in general, proceeds substantially perfectly and carbon dioxide and water are the primary products in this region.

The reforming treatment proposed in the present invention refers to a treatment which takes place under considerably mitigated conditions as compared with the above, that is, in the presence of less oxygen and at relatively low temperatures.

The conditions for the above reforming treatment cover the following ranges: the region where partial oxidation of hydrocarbons occurs and production of carbon monoxide and hydrogen are more pronounced; the region of a more mitigated treatment where lower hydrocarbons with 1 to 5 carbon atoms are produced as a result of the chemical bond rupture, oxygen addition products of these lower hydrocarbons, and aldehydes and ketones which are oxygenated compounds produced by introducing oxygen to hydrocarbon molecules are produced; and the region of a still more mitigated treatment where a mainly gaseous mixture with a composition similar to the volatile components of the original hydrocarbon fuel is produced.

Figure 1:
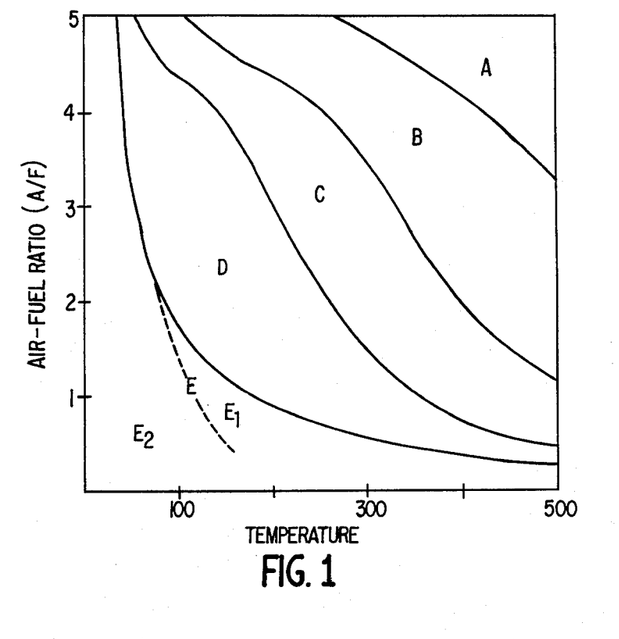
FIG. 1 is a schematic diagram showing the relationship between the mixture ratio of air and hydrocarbon fuel and the temperature in a series of decomposition and oxidation reactions.

FIG. 1 schematically illustrates the positions of boundaries of each region as mentioned above concerning the ratio of air and hydrocarbon fuel (for instance, gasoline) and the temperature. In FIG. 1, A, B, C, D, E, $E_1$ and $E_2$ represent the reaction regions; A being one of perfect oxidation, B one of partial oxidation, C one of intermolecular oxidation, D one of thermal decomposition and E one where no reaction occurs. In A the major components are $CO_2$, $H_2O$; in B, CO, $H_2$; in C, aldehydes and ketones; in D, lower hydrocarbons with 1 to 5 carbon atoms; in $E_1$, a mixture of gaseous hydrocarbons; and in $E_2$, a mixture of liquid hydrocarbons.

The scope of reforming treatments in this invention includes in a series of decomposition and oxidation reactions taking place under the treatment of hydrocarbon fuel in the presence of oxygen, the region of decomposition and oxidation in which hydrocarbons with 1 to 5 carbon atoms are produced by chemical bond rupture of fuel hydrocarbons and addition of oxygen to them and as the oxidation products thereof aldehydes and ketones are formed; the region of partial oxidation in which carbon monoxide and hydrogen are formed; and the region of gasification in which fuel hydrocarbons are evaporated.

The basic range of reforming conditions for hydrocarbon fuel according to the present invention are a relatively low temperature and low oxygen concentration, i.e., 150° to 500°C and a weight ratio of air to fuel hydrocarbon of 1 to 5. Further, the reforming conditions must be such that a flow rate matching the operation of the engine can be assured; with such conditions being secured through adequate function and structure of the fuel reforming means. One method available for this purpose is to mitigate the reforming conditions through proper selection of the catalyst which is used to promote catalytically the oxidation which is the main reaction. In this case, provided that the selection of the catalyst and other important factors such as the temperature, the air (oxygen concentration), and the space velocity of reactants over the catalyst bed are proper, a mixture of decomposition and oxidation products which contribute to improvement of the combustion mechanism in the cylinders can be selectively obtained.

The mixture of decomposition and oxidation products thus yielded in the above-mentioned scope and range of reforming conditions contains: aldehydes and ketones, lower aliphatic hydrocarbons with 1 to 5 carbon atoms, hydrogen, carbon monoxide, carbon dioxide, alkylbenzene derivatives, organic carboxylic acid; and, hydrocarbons yet to react, water and the residual components of the air used as the oxidizing agent are contained.

Figure 2:
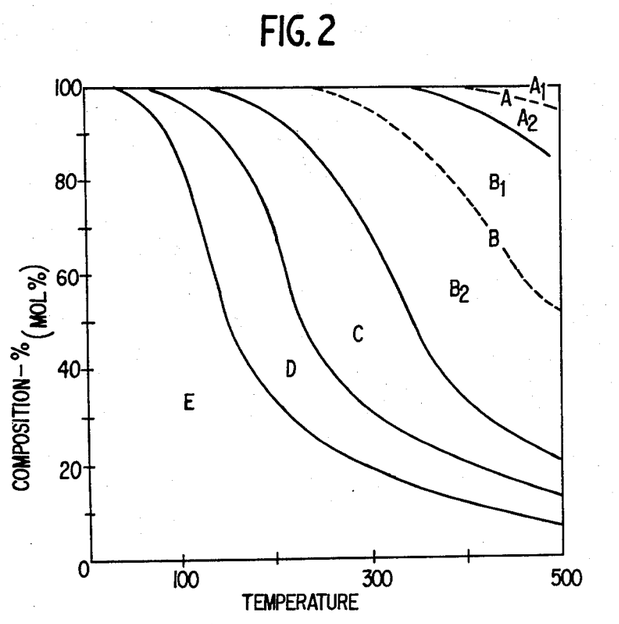
FIG. 2 shows the relationship between the decomposition and oxidation products of n-hexane and the temperature.

FIG. 2 illustrates the formation of a mixture of decomposition and oxidation products in one example of the reforming treatment in which the material is n-hexane and the air-fuel ratio (A/F) is set at 3. in FIG. 2, the major products of reaction are: products of perfect oxidation in A, $H_2O$ in $A_1$, $CO_2$ in $A_2$, products of partial oxidation in B, $H_2$ in $B_1$, CO in $B_2$, aldehydes and ketones which are hydrocarbon compounds containing oxygen in C, hydrocarbons with 1–5 carbon atoms which are lower hydrocarbon compounds in D, and hydrocarbons yet to react, i.e., n-hexane in E.

Figure 3:
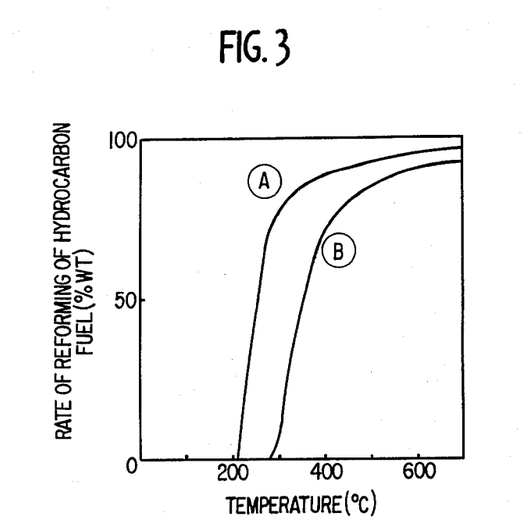
FIG. 3 shows the relationship between the reforming rate of hydrocarbon fuel and the reaction temperature rise with the effect of a catalyst.
Figure 4:
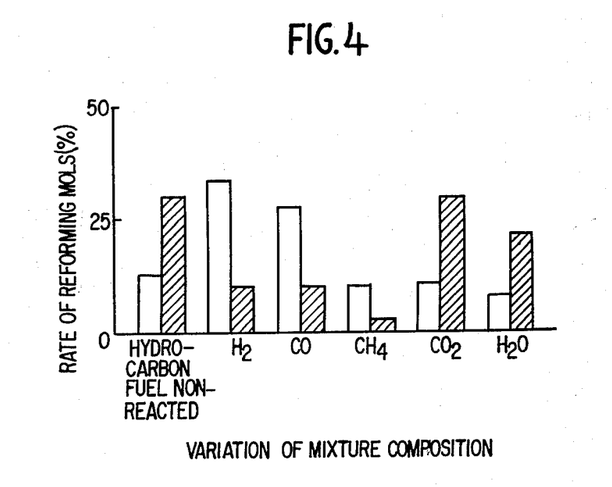
FIG. 4 illustrates an example of the variations of mixture compositions of the reaction products of an air-fuel ratio of 3 and a reaction temperature of 400°C.

FIG. 3 indicates the relationship between the reforming rate of hydrocarbon fuel and reaction temperature rise with the effects of a catalyst, where, Ⓐ Ⓑ indicate typical curves for reforming at an air-fuel ratio of 3 with and without a catalyst, respectively, and FIG. 4 indicates an example of the variation of mixture compositions of products at an air-fuel ratio of 3 and reaction temperature of 400°C, where the white column and diagonally hatched column indicate each of the components obtained by reforming treatment with and without a catalyst, respectively.

As these figures show, for both curves Ⓐ and Ⓑ, the reforming rate of hydrocarbon fuel therefore increases rapidly with a temperature rise over a range of 150°–500°C, the starting temperature shown in curve Ⓐ is lower than curve Ⓑ, the rate shown in curve Ⓐ is higher than curve Ⓑ, and a mixture of chemical species which contribute to combustion, i.e., $H_2$, CO, $CH_4$ and others can be selectively obtained in favor of catalysts.

The mixture of decomposition and oxidation products of the hydrocarbon fuel takes part in the combustion mechanism exhibiting the following effects:

Firstly, the aldehydes and ketones in these products of decomposition and oxidation and the intermediate products of oxidation thereof are extremely effective for improvement and control of combustion;

secondly, the lower aliphatic hydrocarbons produced by chemical bond rupture, gasified hydrocarbons, carbon monoxide and hydrogen, together with the products mentioned above which exert the first effect, associate with increasing the burning velocity and improving combustion itself. Particularly, when they are present in the vicinity of the ignition source and the flame burning surface, the effect is remarkable; and thirdly, the hydrogen present in the products of decomposition and oxidation contributes to reduction and decomposition of nitrogen oxides generated in the combustion process together with carbon monoxide and others.

The first effect which is found particularly significant is hereinafter elaborated. According to "Combustion Flames and Explosions of Gases" by Bernard Lews and Guenther von Elbe et al. the flame-propagation speed and the burning velocity at the interface between flame and combustible medium which affect the traveling reaction zone through the combustible medium are considered to depend on the chain reaction involved by burning; and the rate of this chain reaction is determined by the concentration of chain carriers developed in the process.

In the products of decomposition and oxidation yielded from the fuel-reforming means, lower hydrocarbons with 1 to 5 carbon atoms which are formed as the result of chemical bond rupture and aldehydes and ketones which are products of oxidation thereof are clearly detected. Introduced into the cylinders, these oxidation products are subjected in the combustion process to further oxidation as expressed by the formula (1), thereby yielding radical-peroxide as an intermediate substance and then OH, H and O radicals are formed to act as chain carriers, thus promoting the chain reaction of the combustion.

$$R-CHO + O_2 \rightarrow R-CO(OOH) \rightarrow R-COO + OH \ldots \quad (1)$$

Figure 5:
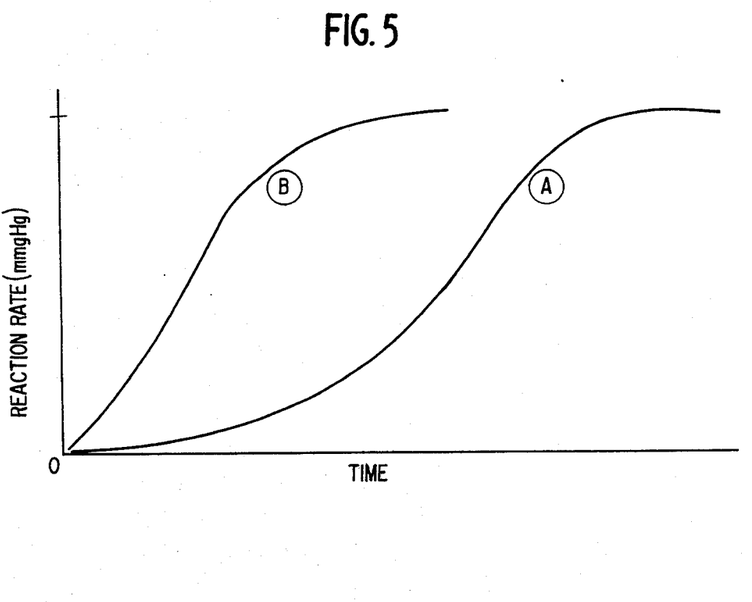
FIG. 5 illustrates curves for the reaction rate in the oxidation process of gaseous hydrocarbons.

Further explanation is to be made in reference to FIG. 5, which illustrates typical kinetic curves for the oxidation of gaseous hydrocarbons with time, where Ⓐ is a curve showing the pressure rise versus time accompanying the oxidation process of the hydrocarbon-air mixture and (B) is a curve showing the similar pressure rise versus time when a small fraction of aldehyde is contained.

It is apparent from FIG. 5 that addition of aldehydes, which is one of the components contributing to the reforming of hydrocarbon fuel, strongly accelerates the reaction rate and promotes the burning velocity. Namely, the supply of aldehyde with carbonyl radical to the cylinders improves the burning velocity on the burning surface.

Figure 6:
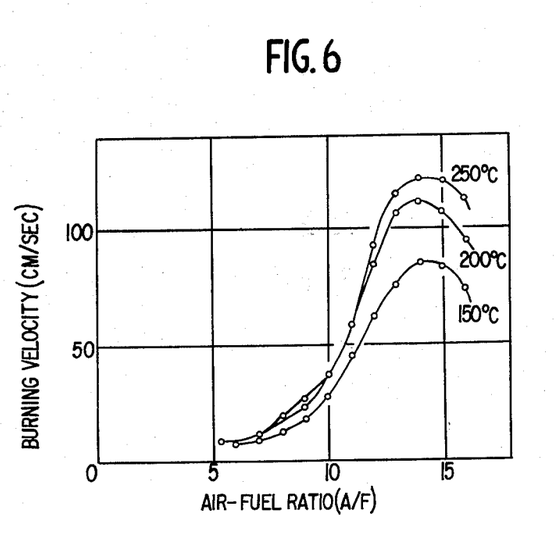
FIG. 6 shows a burning velocity as to the gases of reformed mixtures of hydrocarbon fuel and air at each air-fuel ratio and at the reforming temperatures of 150°C, 200°C and 250°C, respectively.

FIG. 6 indicates the burning velocity with respect to the gases obtained by reforming a mixture of air and hydrocarbon fuel at each air-fuel ratio and prereacting temperatures. It is clear from FIG. 6 that the burning velocity of air-hydrocarbon fuel mixture is rapidly promoted by seeding of the flame surface with chemical species from the reforming treatment at a relatively low temperature.

The present invention provides an internal combustion engine with various merits which are given by an improved mechanism of combustion in which a part of the hydrocarbon fuel supplied to the engine is reform treated under the above-mentioned conditions and then the mixture of decomposition and oxidation products is distributed to the cylinders.

In this case, only a part of hydrocarbon fuel is reform treated for supply to the engine. This is because a relatively small amount of the mixture suffices for ensuring and improving the ignition and combustion in the cylinders. The reforming treatment of all fuel supplied to the engine would involve various drawbacks such as a decrease in the volumetric efficiency, a loss of calorific value inherent in the fuel, difficulty in control of the air-fuel ratio and difficulty in treating the fuel at the start or stop of the engine. Partial reforming treatment of the supplied fuel has an advantage of raising the compression ratio if necessary, thereby improving the rate of fuel consumption by 10 – 15 percent. Also, the partial reforming treatment of the supplied fuel makes it possible to ignite and burn a lean mixture which will not be done in the conventional engine equipped with a carburetor; thereby the harmful elements in the exhaust gas can be reduced. Moreover, the reforming treated fuel contains lower molecule hydrocarbons and other chemical species produced by decomposition and oxidation compared to the original hydrocarbon fuel. Therefore, when they exist in the vicinity of the ignition source or flame surface, it becomes relatively easy to burn a light oil which is usually difficult to burn. Thus, the engine of the present invention is fit for a wide variety of fuels.

The construction, function and effect of a four-cycle reciprocating engine as an embodiment of the present invention is hereinafter described in reference to the attached drawings.

Figure 7:
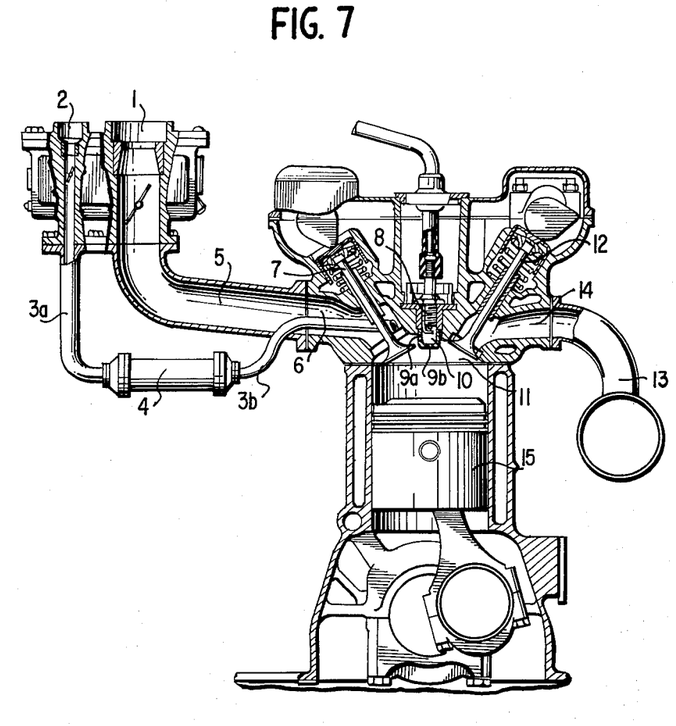
FIG. 7 is a cross-sectional view of an engine as a preferred embodiment of the present invention.

Referring now to FIG. 7, there is shown a main carburetor 1, an auxiliary carburetor 2 and a fuel-reforming means 4, one end of which communicates via an auxiliary suction pipe 3a with the auxiliary carburetor 2 and the other end of which communicates with an auxiliary suction pipe 3b. The auxiliary suction pipe 3b is installed within the intake port 6 and the tip thereof is located upstream of the intake valve 7, where it opens in the direction of a trap chamber 10 which captures a part of the blend of decomposition and oxidation products. The trap chamber 10 includes a built-in spark plug 8 and communicates via the orifices 9a, 9b with the combustion chamber 11. The main intake manifold is shown at 5, the exhaust valve at 12, the exhaust manifold at 13, exhaust port at 14 and the piston at 15.

Figures 8A, 8B:
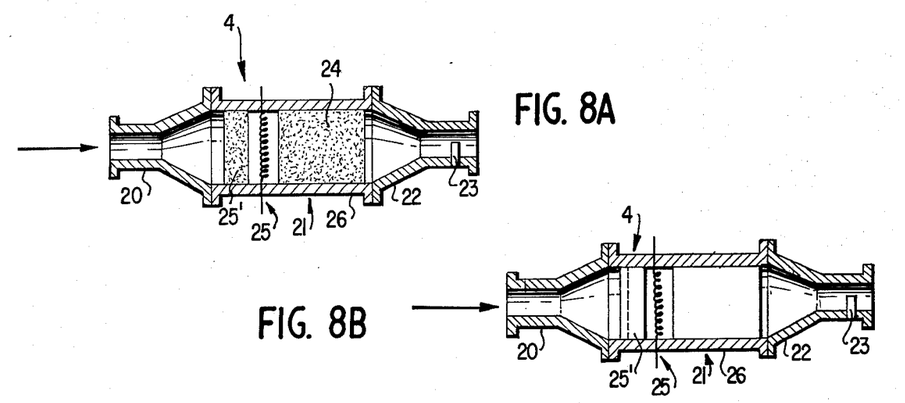
FIGS. 8A and 8B respectively show a fuel-reforming means adopted in the embodiment of the present invention.

FIGS. 8 (A) and (B) respectively show the structure of the fuel-reforming means according to the present invention. The fuel-reforming means 4 includes the inlet 20, the reforming part 21 and the outlet 22. The reforming part 21 includes a cylinder 26, a catalyst bed 24 of alumina, platinum or the like, and an electric heater 25 connected to a battery (not shown). A back-fire-preventing element 25' is arranged just before the electric heater 25 for the purpose of preventing back-fire into the 3a side of the suction pipe.

FIG. 8(A) shows the back-fire-preventing element 25' consisting of catalysts. The reference numeral 23 indicates a thermometer provided at the outlet 22.

Shown in FIG. 8(B) are the inlet 20, the reforming part 21 and the outlet 22, the reforming part being formed as a cylinder, the reforming part houses the electric heater 25 connected to the battery and does not include a catalyst bed. FIG. 8(B) represents the case of reforming a part of the fuel by heating of the heater 25.

In the embodiment with the above construction of the present invention, the fuel supplied to the auxiliary carburetor 2 can easily be ignited near the ignition plug and 12 – 38 percent of the total fuel suffices to provide the mixture of decomposition and oxidation products which is necessary for subsequent combustion and control. This 12 – 38 percent of the fuel is adjusted to a relatively rich mixture in the carburetor 2 which comes via the auxiliary suction pipe 3a into reforming means 4. The rich mixture which has come into the reforming means begins to be reformed through heating by the electric heater 25 and the reformation is maintained by the catalyst bed 24 whose temperature attains the specified level until a reformed mixture of decomposition and oxidation products with the above-mentioned composition is obtained. The fuel thus reformed is in the suction stroke sent to the trap chamber 10 via the auxiliary suction pipe 3b which opens in the vicinity of the intake valve 7 and through the orifice 9a bored in the trap chamber 10. As the tip of the auxiliary suction pipe 3b opens in the direction of the trap chamber 10 upstream of the intake valve 7, a considerable portion of the mixture of decomposition and oxidation products goes into the trap chamber 10 through the orifice 9a.

The remaining portion of the mixture flows out to the top of the combustion chamber 11 and at the end of the compression stroke one part of this portion back flows into the trap chamber 10 through the orifices 9a, 9b of the trap chamber 10. The other part remains near the orifices 9a, 9b at the top of the combustion chamber 11. Meanwhile, the relatively lean mixture which has been sucked into the main carburetor 1 is in the suction stroke supplied to the cylinders via the main intake manifold 5 and the intake valve 7. The relatively rich mixture containing the mixture of decomposition and oxidation products which is now present in the trap chamber 10 is then easily ignited by the spark plug 8 and the combustion is started. As the result of combustion being started in the trap chamber 10, a flame jet spurts into the mixture through the orifices 9a, 9b and through this flame ignition, the lean mixture which occupies the greater part of the combustion chamber 11 and the cylinders is reliably burned. Thus, the lean mixture as a whole can be burned and the amount of harmful elements in the exhaust gas can be reduced. In this connection, when reforming the fuel, it is further desirous to utilize the catalyst reaction.

In the illustrated embodiment of the present invention, an auxiliary suction pipe and a trap chamber are effective means for adopting a partial reforming treatment of the supplied fuel, but the present invention is not confined to use of such an auxiliary suction pipe and such a trap chamber.

The proportion of the part of fuel supplied to the auxiliary carburetor in the above is set at 12 to 38 percent, which is found one of the most effective ratios for reducing the harmful elements in the exhaust gas in the present embodiment using the auxiliary suction pipe and the trap chamber; and this ratio can vary with an internal combustion engine of different construction and performance.

In the case of a rotary piston engine, the above-mentioned effects will be attained by sucking and holding the mixture of decomposition and oxidation products in a belt fashion along the center line of the width of the rotor housing where the spark plug is located and thus the difficulty of combustion in the conventional rotary piston engine will be eliminated for better performance and exhaust gas.

FIGS. 9A–D illustrate examples of improvement ass to the performance of the engine and the harmful components emitted therefrom in the case of using the reformed fuel.

For this purpose, the experiments were conducted for the engine installed with a trap chamber and for a conventional engine using the reformed fuel.

More specifically, FIGS. 9A–D are diagrams showing comparison of characteristics among the cases of: (W) operating the conventional internal combustion engine with the non-reform treated fuel, (X) operating the conventional internal combustion engine with the reform treated fuel, (Y) operating the internal combustion engine installed with a trap chamber by the non-reform treated fuel and (Z) operating the internal combustion engine installed with a trap chamber by the reform treated fuel.

Figure 9A:
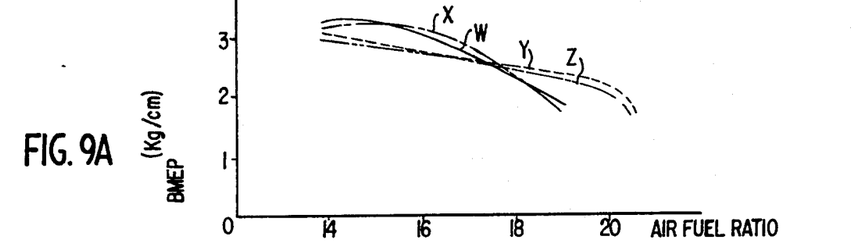
FIG. 9A–D are diagrams showing the relationship between the air-fuel ratio and the break mean effective pressure or the emission amount of NOx and HC in the case of operating the internal combustion engine with the reforming or non-reforming treated fuel.

In more detail, FIG. 9A shows the relationship between the air-fuel ratio and the break mean effective pressure (B.M.E.P.). As is evident from this diagram, the engines are of little difference in the break mean effective pressure, i.e., driving torque, regardless of the reform treatment of the fuel.

Figure 9B:
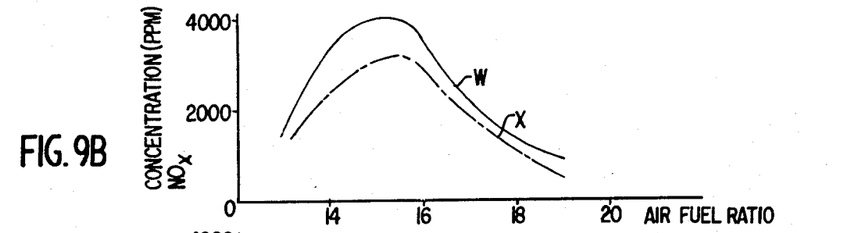
Figure 9C:
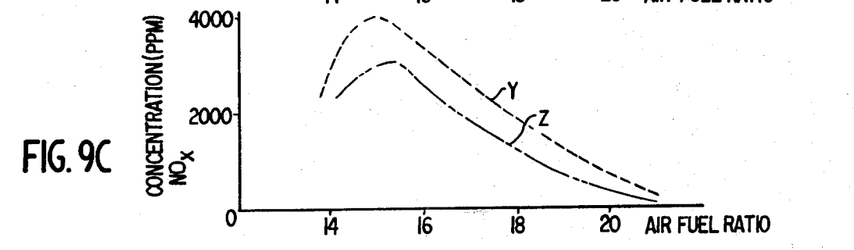
Figure 9D:
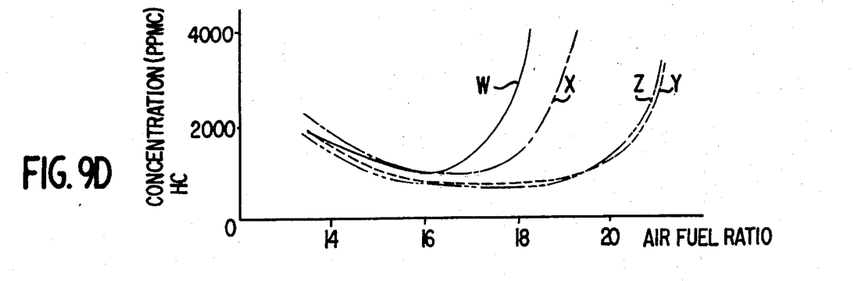

FIGS. 9B–C respectively show the relationship between the air-fuel and the emission amount of NOx as to the conventional internal combustion engine and the internal combustion engine installed with the trap chamber. From these, it is apparent that the emission amount of NOx lowers substantially, when both of the engines are operated by the reform treated fuel. Moreover, the emission amount of HC, which is given in FIG. 9D, indicates that there is little difference between the reforming-and the non-reforming fuels. However, in the case of a conventional internal combustion engine, the region generating the maximum amount of hydrocarbons shifts to the right-direction in this figure by employing the reformed fuel, which means that the combustible critical range of the air-fuel ratio expanded.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A method for reducing emission of harmful elements in the exhaust of an internal combustion engine, comprising the steps of:
   introducing a first quantity of fuel and a first quantity of air into a reformer;
   reforming said first quantity of fuel into a first mixture containing decomposition and oxidation products of said first quantity of fuel;
   feeding said first mixture to a combustion chamber of said engine;
   feeding a second quantity of fuel and a second quantity of air to said combustion chamber, wherein said second quantity of fuel and said second quantity of air have not passed through said reformer; and
   burning said first mixture and said second quantity of fuel in said combustion chamber.

2. A method according to claim 1, wherein said first mixture, said second quantity of fuel and said second quantity of air are mixed prior to ignition in said combustion chamber.

3. A method according to claim 1, wherein said second quantity of fuel and said second quantity of air from a lean mixture in said combustion chamber, and wherein said first mixture is introduced essentially separately from said lean mixture.

4. A method according to claim 3, wherein said first mixture is introduced adjacent an ignition means in said combustion chamber.

5. A method according to claim 3, wherein at least a portion of said first mixture is introduced into a trap chamber enclosing an ignition plug in said combustion chamber.

6. A method according to claim 1, wherein said decomposition and oxidation products include carbon monoxide and hydrogen 7. A method according to claim 1, wherein said decomposition and oxidation products include aldehydes and ketones.

8. A method according to claim 1, wherein said decomposition and oxidation products include lower aliphatic hydrocarbons having from 1 to 5 carbon atoms.

9. A method according to claim 1, wherein said first mixture also includes a vaporized non-reformed fuel.

10. A method according to claim 1, wherein said reforming is carried out in the presence of a catalyst.

11. A method according to claim 1, wherein the air-fuel ratio of said first quantity of fuel and said first quantity of air is between 1 and 5, and wherein said reforming is carried out at temperatures between 150° and 500°C.

12. A method according to claim 1, wherein said first quantity of fuel is 12 to 38 percent by weight of the sum of quantities of said first and second quantities of fuel.

13. A method according to claim 4, wherein said first mixture is fed mainly to the top of said combustion chamber and wherein said ignition means is located in said top of said combustion chamber.

14. A method according to claim 3, wherein said lean mixture is fed into said combustion chamber through an intake port and said first mixture is fed into said combustion chamber through an auxiliary suction conduit which opens upstream of and in the vicinity of an intake valve disposed in said intake port.

15. A method according to claim 5, wherein said trap chamber has at least one aperture, whereby a portion of said first mixture is introduced into said trap chamber through said aperture to be ignited in said trap chamber such that a flame spurts into said lean mixture through said aperture.

16. A method according to claim 1, wherein:
said first quantity of fuel and said first quantity of air are mixed to form a rich air-fuel mixture in an auxiliary carburetor prior to introduction into said reformer;
said second quantity of fuel and said quantity of air are mixed in a main carburetor to form a lean air-fuel mixture prior to being fed to said combustion chamber through a main intake manifold and an intake port, said manifold being connected to said main carburetor at one end thereof and to said intake port at the other end thereof; and
said first mixture is fed through an auxiliary intake conduit which is connected to said reformer at one end thereof and being open at the other end thereof upstream of and in the vicinity of intake valve disposed in said intake port.

17. A method of reducing emission of harmful elements in the exhaust of an internal combustion engine having a combustion chamber comprising the steps of:
introducing a hydrocarbon fuel and air into a reforming chamber;
reforming said fuel so as to produce a reformed fuel comprising decomposition and oxidation products;
introducing air, said reformed fuel and a non-reformed fuel into said combustion chamber wherein the predominant amount of the total quantity of fuel introduced into said combustion chamber has not been passed through said reforming chamber.

18. The method of claim 17, wherein said fuel introduced into said reforming chamber is reformed at temperatures of 150 to 500°C.

19. The method of claim 17, wherein said non-reformed fuel is mixed with said reformed fuel prior to ignition in said combustion chamber.

20. The method of claim 19, wherein said second mentioned air is mixed with said non-reformed fuel prior to being mixed with said reformed fuel.

21. The method of claim 17, wherein at least a portion of said reformed fuel is introduced essentially separately from said non-reformed fuel into said combustion chamber.

22. The method of claim 17, wherein at least a portion of said reformed fuel is introduced adjacent an ignition means in said combustion chamber.

23. The method of claim 17, wherein the quantity of fuel introduced to said reformer is 12 to 38 percent of the total quantity of fuel introduced into said combustion chamber.

24. The method of claim 17, wherein said decomposition and oxidation products include carbon monoxide and hydrogen.

25. The method of claim 17, wherein said decomposition and oxidation products include aldehydes and ketones.

26. The method of claim 17, wherein said decomposition and oxidation products include lower aliphatic hydrocarbons having from 1 to 5 carbon atoms.

27. The method of claim 17, wherein a portion of said hydrocarbon fuel introduced into said reforming chamber is vaporized without being reformed and wherein said vaporized non-reformed fuel is introduced into said combustion chamber with said reformed fuel.

28. The method of claim 17, wherein said reforming is conducted in the presence of a catalyst.

29. The method of claim 17, wherein the air-fuel ratio in said reforming chamber is between 1 and 5 and wherein said reforming is conducted at temperatures between 150° and 500°C.

30. The method of claim 17, wherein at least a portion of said reformed fuel is fed into a trap chamber in said combustion chamber and wherein said reformed fuel in said trap chamber is ignited so as to produce a flame which spurts into the remaining portion of fuel in said combustion chamber.

31. An internal combustion engine, comprising:
a combustion chamber;
a piston disposed in said combustion chamber;
a power take-off mechanism operatively connected to said piston and cooperating therewith for producing and transmitting power produced in said combustion chamber;
an exhaust system connected to said combustion chamber;
a first supply system connected to said combustion chamber for supplying a lean air-fuel mixture thereto;
means for reforming fuel and air into a first mixture comprising decomposition and oxidation products of said fuel;
a second supply system connected to said means for reforming for supplying said fuel and air to said means for reforming at a rich air-fuel ratio; and
an intake system connected at one end thereof to said means for reforming and operatively connected at the other end thereof to said combustion chamber for supplying said first mixture to said combustion chamber.

32. An engine according to claim 31, further comprising ignition means disposed in said combustion chamber, and wherein said other end of said intake system is disposed such that a considerable portion of said first mixture is fed to the vicinity of said ignition means.

33. An engine according to claim 31, wherein said second supply system is adjusted to keep said rich air-fuel ratio between 1 and 5.

34. An engine according to claim 31, wherein said means for reforming is adapted to carry out said reforming at temperatures between 150 and 500°C.

35. An engine according to claim 31, wherein said first supply system comprises a first carburetor and said second supply system comprises a second carburetor connected to said means for reforming.

36. An engine according to claim 34, wherein said combustion chamber is defined by a cylinder and a cylinder head and wherein said piston is a reciprocating piston.

37. An engine according to claim 35, wherrein said first supply system further comprises an intake manifold connected to said first carburetor, an intake port connected to said intake manifold and communicating with said combustion chamber, and wherein an intake valve is disposed in said intake port and said intake system comprises a conduit connected to said means for reforming at one end thereof, the other end of said conduit opening into said intake port upstream of and in the vicinity of said intake valve.

38. An engine according to claim 32, further comprising a trap chamber disposed in said combustion chamber enclosing said ignition means and having at least one aperture defined therein, said trap chamber being capable of trapping said first mixture which enters into said trap chamber through said aperture whereby said first mixture is ignited in said trap chamber which produces a flame to spurt through said aperture.

39. An engine according to claim 34, further comprising a fuel tank connected to said first and second carburetors, and wherein said fuel is gasoline and said fuel is 12 to 38 percent by weight of the total fuel introduced into said combustion chamber.

40. An engine according to claim 31, wherein said means for reforming includes a catalyst thereby said reforming being conducted in the presence of said catalyst.

41. An engine according to claim 32, wherein said means for reforming includes a catalyst thereby said reforming being conducted in the presence of said catalyst.

42. An engine according to claim 31, wherein said means for reforming comprises a heating element disposed therein for heating said fuel, and a backfire trap disposed therein for preventing backfiring into said second supply system.

* * * * *